United States Patent [19]
Bonham, Jr.

[11] Patent Number: 4,665,705
[45] Date of Patent: May 19, 1987

[54] GEOTHERMAL PLANT SILICA CONTROL APPARATUS AND METHOD

[75] Inventor: Enos A. Bonham, Jr., Baton Rouge, La.

[73] Assignee: Magma Power Company, Los Angeles, Calif.

[21] Appl. No.: 875,694

[22] Filed: Jun. 18, 1986

Related U.S. Application Data

[63] Continuation-in-part of Ser. No. 724,950, Apr. 22, 1985, abandoned, which is a continuation of Ser. No. 611,979, May 18, 1984, abandoned.

[51] Int. Cl.$^4$ ............................................. F03G 7/04
[52] U.S. Cl. .................................. 60/641.5; 60/641.2
[58] Field of Search .................... 60/641.2, 641.5, 646, 60/657; 165/45

[56] References Cited

U.S. PATENT DOCUMENTS

| | | | |
|---|---|---|---|
| 4,304,666 | 12/1981 | Van Note | 60/641.2 X |
| 4,370,858 | 2/1983 | Awerbuch et al. | 60/641.5 |
| 4,479,351 | 10/1984 | Awerbuch et al. | 60/641.5 |
| 4,502,285 | 3/1985 | Awerbuch et al. | 60/641.5 |

*Primary Examiner*—Stephen F. Husar
*Attorney, Agent, or Firm*—Albert L. Gabriel

[57] ABSTRACT

Apparatus and method for minimizing silica scaling in steam flash vessels employed in a geothermal power plant energized by steam flashed from high temperature geothermal brine derived from a source such as the Salton Sea Geothermal Field or the Brawley Geothermal Field where the brine is substantially saturated with dissolved silica. The silica is preferentially precipitated upon silica seeds that are introduced into one or more flash crystallizer steam separators. The seeded brine is recirculated through each flash crystallizer a plurality of times under thermal power provided by the effects of flashing the incoming brine into an external draft tube so as to provide a sufficient residency time of the seeded brine in the flash crystallizer for the silica solution, which has become supersaturated because of the temperature reduction associated with the flashing, to be precipitated down to approximately saturation. The flashing brine stream is directed from the top of the draft tube into the flash crystallizer above the surface of the liquid brine, preferably directed downwardly at an inclind angle toward such surface, to prevent upward "geysering" of liquid brine and silica particles from such surface toward the vapor takeoff system leading to power turbines, and for increased flashing efficiency.

29 Claims, 2 Drawing Figures

GEOTHERMAL PLANT SILICA CONTROL APPARATUS AND METHOD

RELATED APPLICATIONS

The present application is a continuation-in-part of Ser. No. 724,950, filed Apr. 22, 1985, now abandoned which in turn was a continuation of Ser. No. 611,979, filed May 18, 1984, now abandoned.

BACKGROUND OF THE INVENTION

1. Field of the Invention

The present invention is in the field of electrical power production from steam flashed from high temperature geothermal brines which have high dissolved silica content.

2. Description of the Prior Art

Some high temperature geothermal brine resources are known which contain very large amounts of geothermal energy, but which until recently had not been usable for the commercial production of electrical power because of a high dissolved silica content, which was substantially at the saturation level at source temperatures. Thus, the Salton Sea Known Geothermal Resources Area (KGRA) is estimated to have approximately 3,400 $MW_e$ of geothermal energy available for the generating of electrical power, but until very recently the precipitation of large quantities of dissolved solids, primarily silica, from the brine as its temperature was reduced by the extraction of thermal energy for generating electrical power, has deterred the development of this large geothermal resource. The KGRA geothermal resource is estimated to be a greater energy reserve even than the oil reserves on the north slope of Alaska. Information on this silica precipitation problem has been gathered during independent tests from 1972 to 1976 by Magma Power Company (Magma) and New Albion Resources Co. (NARCO), a subsidiary of San Diego Gas and Electric (SDG&E), and then during operation of the Geothermal Loop Experimental Facility (GLEF) by Magma, SDG&E and NARCO from 1976 to 1979. This testing showed that the silica precipitation problem was so severe that approximately 42 inches per year of scaling, which was primarily amorphous silica, grew on the inner walls of pipes and vessels, and this was impossible or at least uneconomical to deal with by replacing equipment or attempting to physically remove the very hard scale. The severity of this scaling can be appreciated when it is considered relative to typical 10 or 12 inch ID piping, which would become closed to an effectively inoperable status within only a matter of a few weeks.

U.S. Pat. No. 4,302,328 issued Nov. 24, 1981 and U.S. Pat. No. 4,304,666 issued Dec. 8, 1981, both to Van Note, taught the use of a reactor clarifier, a type of apparatus previously known in the sewage treatment art, for the reduction of silica content of the high silica geothermal brines presently under consideration, so as to protect reinjection well equipment against silica plugging. However, this only involved the lower temperature, tail-end part of a proposed geothermal electrical plant, and did not have any effect on the silica precipitation problem in heat extraction apparatus such as steam separators. Thus, where a plurality of steam separators in successively lowering temperature and pressure ranges were contemplated for a geothermal electrical power plant, the use of a reactor clarifier in a downstream, lower temperature location could not check the silica from starting to precipitate out onto walls of a first stage steam separator or from precipitating out in large quantities on walls of a second stage, lower temperature steam separator, as well as in associated conduits and valves.

U.S. Pat. No. 4,429,535 issued to Featherstone Feb. 7, 1984 teaches the use of flash crystallizers for flashing geothermal brine to steam for generating electrical power, and teaches seeding of the hot geothermal brine in the flash crystallizers with seeds derived from a downstream reactor clarifier used as taught in the aforesaid U.S. Pat. Nos. 4,302,328 and 4,304,666, for preferential precipitation of silica upon a vast seed particle area rather than on the surfaces of the flash vessels and associated piping and valves. The Featherstone U.S. Pat. No. 4,429,535 teaches the use of an internal draft tube in each flash crystallizer within which the entering hot geothermal brine is released to flash partially into steam so as to cause recirculation of the seeded brine a plurality of times motivated by the power of the flashing steam within the draft tube. However, such internal draft tube recirculation has several associated problems. One of these is that the brine and flashing steam upwelling through the internal draft tube causes "geysering" or massive entrainment of liquid and particulate silica, and this requires special deflecting equipment to prevent the liquid and particles from passing into the vapor takeoff system. Another problem is that valving of the hot geothermal brine into the flash crystallizers was difficult and scale buildup tended to be a problem in the valve means and associated conduits.

Another prior art method for controlling mineral precipitation in connection with a geothermal electrical power plant was taught in U.S. Pat. No. 3,757,516 issued to McCabe. That patent taught the principle of deep well pumping in the geothermal brine production well and pressurization throughout the entire plant system on through reinjection to avoid loss of the heat of vaporization from that portion of the brine which would otherwise flash to steam in the production well, and incidentally to reduce mineral precipitation in the brine flow path. However, the said McCabe U.S. Pat. No. 3,757,516 was concerned only with those geothermal resources having temperatures under about 400° F., where the loss of heat of vaporization would represent the loss of a considerable proportion of the available thermal energy, so that flashing in the production well bore would cause a serious energy loss in the system. Also, the mineral precipitation that was of principal concern in that patent was calcium carbonate, which, without the pumping, would be precipitated from brines having a substantial calcium oxide content, due to the release of carbon dioxide from the brine during flashing and the chemical combining of carbon dioxide with calcium oxide to form the calcium carbonate precipitate.

The pressurization procedure taught in the McCabe U.S. Pat. No. 3,757,516, while effective to prevent some types of scaling such as from calcium carbonate, would, however, not be effective to prevent dissolved silica from precipitating out on walls of heat extraction and reinjection equipment of a geothermal power plant, as such silica precipitation depends only upon temperature reduction to put the dissolved silica in a supersaturated condition, and time for the slow silica precipitation reaction to occur. Nevertheless, the relatively low geothermal hot water or brine source temperatures to which that patent applied did not carry the large quantities of silica (even if saturated with silica) that are found at substantially the saturation level in very hot brines ranging from about 500° F. to about 620° F. in geothermal energy resources like the Salton Sea and Brawley Geothermal Fields. It is these large quantities of silica in very hot brine which until recently have presented insurmountable problems in attempts to utilize this huge geothermal potential energy resource for the commercial generation of electrical power.

U.S. Pat. No. 4,043,129 issued to McCabe and Zajac applied the deep well pumping concept of the earlier McCabe U.S. Pat. No. 3,757,516 to high temperature geothermal brines above about 500° F. The McCabe-Zajac U.S. Pat. No. 4,043,129 taught that the advantages of deep well pumping, including avoidance of the loss of heat of vaporization and reduction of mineral precipitation, could be realized in connection with very high temperature geothermal brines by mixing a high temperature geothermal brine which might have a relatively high mineral content derived from a relatively deep well with a lower temperature brine that might have a relatively low mineral content derived from a shallower or peripheral well, to produce a brine mixture of sufficiently lowered temperature to be within the practical temperature and pressure ranges for pumping and which may also have a diluted mineral content. However, this still would not solve the serious silica scaling problem in plant and reinjection equipment where the high temperature brines had a dissolved silica content proximate saturation levels at source temperatures, the situation in the Salton Sea and Brawley Geothermal Fields.

SUMMARY OF THE INVENTION

In view of these and other problems in the art, it is a general object of the present invention to provide apparatus and method for minimizing silica scaling in steam flash crystallizer vessels employed in a geothermal power plant energized by steam flashed from high temperature geothermal brine that is produced from a source where the brine is substantially saturated with dissolved silica, such as the Salton Sea Geothermal Field or the Brawley Geothermal Field, both located in the Imperial Valley of California.

Another general object of the invention is to provide apparatus and method for reducing silica scaling in steam flash crystallizer vessels employed in a geothermal power plant which is an improvement over the system for such purpose shown and described in the said Featherstone U.S. Pat. No. 4,429,535.

A further object of the invention is to provide a novel geothermal brine recirculation loop comprising a flash crystallizer steam separator and an associated draft tube which is external to the flash crystallizer, wherein the incoming brine to be flashed within the flash crystallizer first enters the draft tube where it preliminarily flashes to provide thermal power for circulating an unflashed portion of the geothermal brine a plurality of times through the recirculation loop, and then is discharged from the draft tube into the flash crystallizer above the liquid brine surface level therein.

A still further object of the invention is to provide a flash crystallizer and draft tube loop of the character described in a geothermal energy power plant wherein the incoming geothermal brine is directed upwardly into the draft tube to provide additional circulation power for circulating the brine through the recirculation loop.

An additional object of the invention is to provide a flash crystallizer and draft tube loop of the character described in a geothermal energy power plant, wherein the incoming geothermal brine is introduced into the draft tube through an inlet valve that is closely associated with a Venturi region of the draft tube so that an increased velocity flow of brine with entrained particulate material will clean off scale that may tend to form on the inlet valve.

The novel flash crystallizer and external draft tube loop of the present invention is employed in one or more stages in a geothermal power plant to receive high temperature, high silica content geothermal brine from a production well and to flash a portion of such brine into steam for driving an electric power generator. The spent geothermal brine from the one or more flash crystallizer/draft tube loop stages then passes into a reactor clarifier, the brine containing suspended, particulate silica from precipitation that was caused to occur in the one or more upstream flash crystallizer/draft tube loops, and further particulate silica precipitation occurs within the reactor clarifier. The silica particles are collected in the form of silica sludge from the bottom of the reactor clarifier and processed for disposal, and the clarified brine stream then is passed to a reinjection well. A small amount of the silica sludge that is obtained from the reactor clarifier is fed back into at least the most upstream of the flash crystallizer/draft tube loops for seeding silica precipitation in such loop and thereby causing such precipitation to preferentially be in particulate, suspended form rather than as damaging scale in such flash crystallizer/draft tube loop.

According to the invention, the incoming hot geothermal brine from the production well or from an upstream flash crystallizer/draft tube loop is delivered into the draft tube portion of a flash crystallizer/draft tube loop, and some flashing occurs in the draft tube to provide power for recirculating the seeded brine a plurality of times through the loop so as to provide the necessary residency time of the seeded brine in the flash crystallizer for the silica solution, which has become supersaturated because of the temperature reduction associated with the flashing, to be precipitated down to approximately the saturated level. The primary flashing occurs when the incoming brine wells upwardly through the draft tube and is released from the upper end of the draft tube into the flash crystallizer above the surface of the liquid brine therein, preferably being directed downwardly at an inclined angle toward the surface. This completely avoids the usual upwardly directed "geysering" or massive entrainment of liquid brine and silica particles from the surface of the brine in the flash crystallizer, which is a problem in conventional internal draft tube-type flash crystallizers; and this flashing above the liquid level also provides better flashing efficiency than the flashing below the liquid level that occurs in conventional internal draft tube-type flash crystallizers. In one form of the invention, the incoming hot geothermal brine is delivered into a lower portion of the draft tube through an injector pipe which opens upwardly into the draft tube so that the momentum of the incoming brine will provide additional circulation power for circulating the brine through the recirculation loop. In another form of the invention, the draft tube has a Venturi throat formed therein to provide a high velocity flow of the brine with entrained silica particles, and by having the brine inlet valve to the draft tube closely coupled to this Venturi throat this high velocity flow will clean off scale that may otherwise tend to form on the valve.

BRIEF DESCRIPTION OF THE DRAWINGS

These and other objects of the invention will become more apparent in view of the following description and the accompanying drawings, wherein.

DETAILED DESCRIPTION

The drawings illustrate two forms of the invention wherein a flash crystallizer having an external draft tube is utilized as a flash vessel for flashing a portion of a flow stream of hot geothermal brine into steam for driving one or more turbines to produce electrical power, while at the same time is also utilized for precipitating in suspended, particulate form large quantities of dissolved silica from the brine so as to avoid the precipitation of such silica on walls of the flash vessel and associated piping and valving. The spent geothermal brine having suspended, particulate silica therein flows downstream from the flash crystallizer and the particulate silica is removed from the flow stream prior to reinjection of the flow stream through a reinjection well back into the aquifer.

Figure 1:
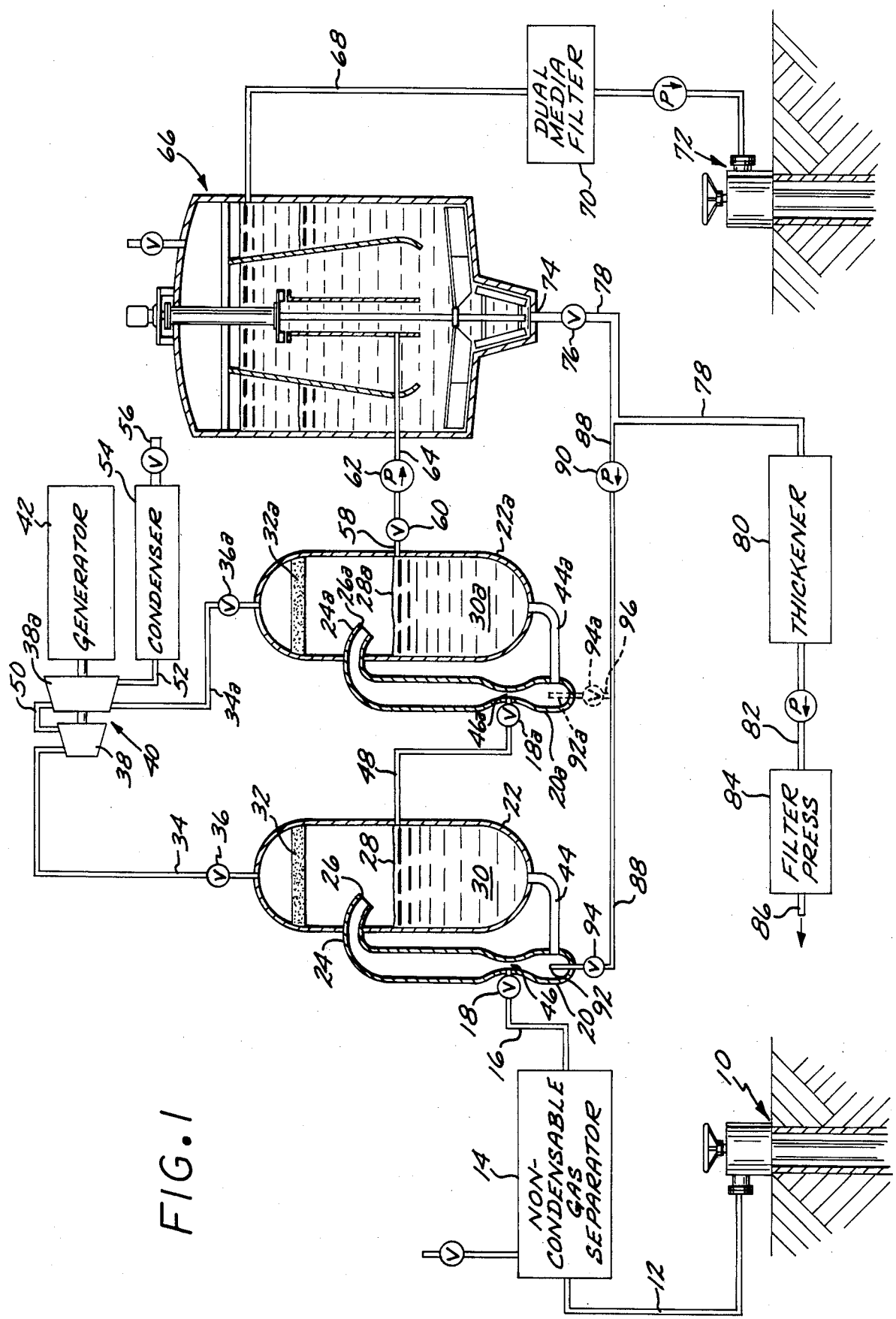
FIG. 1 is a diagrammatic view illustrating one embodiment of the invention in which the hot geothermal brine enters the draft tube of the flash crystallizer/draft tube loop at a Venturi throat formed in the draft tube.

Referring at first to FIG. 1 of the drawings, a geothermal production well generally designated 10 provides underground access to hot geothermal brine of the type to which the present invention is applicable, namely, hot geothermal brine having physical and chemical characteristics which make it particularly attractive as a source of heat energy for the production of electrical power; but which characteristics have, because of the the limitations of prior art technology in this field, precluded the commercial production of electrical power from such brine until only quite recently. The principal physical characteristic of the hot geothermal brine is that it should have a sufficiently high underground source temperature to enable the brine to be flowed up through the well under the power of its own flashing steam, yet with the brine temperature still remaining sufficiently high at the wellhead for the efficient operation of one or more electrical power generating turbines directly from steam separated from the geothermal brine. Alternatives to such direct steam turbine generating of electrical power which are within the scope of the present invention are a binary system wherein one or more working fluids receive heat energy in heat exchange relationship with steam separated from the brine and then drive the electrical power generating turbine means, or a system wherein separated steam both directly drives turbine means and passes heat to a power or working fluid in a binary system. For these purposes it is preferred that the source or bottom hole temperature of the geothermal brine be at least approximately 450° F., and the wellhead temperature be at least approximately 350° F.

A chemical characteristic of such high temperature source geothermal brine is that it will normally have a high concentration of dissolved silica therein, which is a result of the greatly increased solubility of underground source silica rock formations at high source temperatures as compared with the solubility of silica at lower source temperatures. This characteristically high dissolved silica content of very hot geothermal brine sources has been a major obstacle to the commercial production of electrical power despite very large amounts of thermal energy present in such brine sources, because of the precipitation of large amounts of silica scale in the form of an amorphous glaze inside of vessels, conduits and valves as heat is extracted from the brine and the brine temperature is lowered through a thermal energy extraction plant system, and also because of rapid plugging of injection wells from such precipitated scale.

An example of a geothermal resource to which the present invention is applicable is the Salton Sea Geothermal Field, sometimes referred to as the "Salton Sea Geothermal Anomaly," located in the Nyland region of the Imperial Valley in California. Another example of a geothermal resource to which the present invention applies is the Brawley Geothermal field, also in the Imperial Valley. Several geothermal wells have been drilled to different depths by Magma Power Company of Los Angeles, California in the Salton Sea Geothermal Field, and the geothermal brines produced by these wells have been extensively tested. A relatively shallow one of these wells provides geothermal brine at a bottom hole source depth of 2,100 feet which has a temperature of approximately 515°–520° F. The brine from this well contains between approximately 550 and 600 ppm (parts per million by weight) dissolved silica ($SiO_2$). A deeper one of the Magma Power Company wells at the Salton Sea Geothermal Field provides access to geothermal brine at a depth of approximately 4,000 feet, producing brine having a source temperature of approximately 620° F., with approximately the same proportion of dissolved silica as found in the brine of the 2,100 foot deep source. The dissolved silica is at substantially the saturated level for the brine temperature in both of these geothermal brine sources, since the silica saturation curve generally levels off in the range of these high temperatures. In the Brawley Geothermal Field, test wells with depths on the order of about 6,000 to 8,000 feet have produced geothermal brines having source temperatures of about 500°–550° F., with about 500–600 ppm of dissolved silica, which is also a substantially saturated content of silica in the geothermal brine.

Referring again to FIG. 1 of the drawings, the geothermal brine well 10 will be assumed by way of example only, and not of limitation, to have the physical and chemical characteristics of the aforesaid 2,100 foot deep Magma Power Company well in the Salton Sea Geothermal Field. Thus, this brine has a source or bottom hole temperature of between about 515° and 520° F. The temperature of this geothermal brine at the wellhead after it has flowed up under the power of its own flashing steam will be on the order of about 400° F. The hot geothermal brine exits the production well 10 through a supply conduit 12 which feeds the brine through a non-condensable gas separator or decoupling drum 14 to brine input conduit 16 from which the hot geothermal brine is fed through an inlet valve 18 to a generally vertically oriented external draft tube or vessel 20 that is operatively connected to a high pressure flash crystallizer 22 so as to discharge the incoming hot geothermal brine into the flash crystallizer 22 and at the same time provide the motivating power for circulating the hot geothermal brine a plurality of times through the flash crystallizer 22.

The upper end of external draft tube 20 communicates with the inside of flash crystallizer 22 through a discharge conduit 24 which has an exit nozzle 26 that is spaced above the surface level 28 of the body 30 of brine within flash crystallizer 22. The discharge nozzle 26 is directed downwardly at an inclined angle toward the brine surface 28. The primary flashing of brine to steam takes place when the brine is released through the nozzle 26 into the flash crystallizer 22, and by directing the nozzle downwardly toward the brine surface 28 all of the liquid brine and entrained particulate material will flow downwardly into the body 30 of brine, and none of it will tend to move in the direction of the steam takeoff system proximate the top of flash crystallizer 22. Releasing the brine and flashing steam above the surface 28 of brine 30 produces a high flashing efficiency because of the very high surface-to-mass ratio of the brine as it is released from the nozzle 26, as compared to flashing below the surface level of the brine as it was previously done in internal draft tube-type flash crystallizers. The large amount of kinetic energy released upon the flashing into the reduced pressure vapor zone of the flash crystallizer is enabled, because of the low density vapor phase of the release zone, to break the brine apart into a large surface area for the flashing, as compared to the confinement of flashing in the high density body of liquid brine which is the case for conventional internal draft tube-type flash crystallizers.

There will be a continuous flashing to steam of some of the hot geothermal brine in the high pressure flash crystallizer 22, and this high pressure steam rises through a demister 32 and is fed from the top of flash crystallizer 22 through high pressure steam conduit 34 having control valve 36 therein to high pressure stage 38 of multistage steam turbine 40 which drives an electric power generator 42. The demister 32 is preferably of the York or Brinks type, and liquid condensed by the demister 32 falls by gravity down the passageway defined within the flash crystallizer 22 to enter the body 30 of brine therein.

The external draft tube 20, its discharge conduit 24 and nozzle 26, the flash crystallizer 22, and a return conduit 44 between the bottom of flash crystallizer 22 and the draft tube 20 proximate its lower end constitute a recirculation loop for the hot geothermal brine in which the brine flows upwardly through the draft tube 20, transversely and downwardly through discharge conduit 24 and nozzle 26, downwardly through the lower portion of flash crystallizer 22, and then transversely through the connecting conduit 44 back into the draft tube 20.

Flow of the hot brine through this recirculation loop is powered by translating thermal energy into circulation energy in the external draft tube 20. A portion of the brine solution flashes into steam as the brine is released through inlet valve 18 into the tube 20 through inlet valve 18, thereby forming a vertically rising mixture of vapor and amorphous particles composed primarily of silica, and supersaturated brine solution. Continuous recirculation of the brine upwardly through the draft tube 20 and then downwardly through the flash crystallizer 22 is produced by the density of the brine within the draft tube 20 being lower than the density of the brine in the flash crystallizer 22 due to both the bubbling steam in the draft tube 20 and the higher temperature of the brine in the draft tube 20.

In the embodiment of the invention shown in FIG. 1, the draft tube 20 is constricted to a Venturi zone 46 where the brine inlet from the production well 10 enters the draft tube 20, and the inlet valve 18 is closely coupled to this Venturi zone 46 so that a high velocity upward flow of brine and entrained particles will continuously clean off any scale that may tend to be deposited on the valve. This will enable an ordinary control valve such as a plug valve to be used for the inlet valve 18. Also, the lowered pressure in the Venturi zone 46 will encourage instantaneous flashing of a portion of the brine to steam when it enters the external draft tube 20, assisting in the aforesaid translation of thermal energy into circulation energy.

After the brine has flashed into the high pressure flash crystallizer 22, the brine in the flash crystallizer 22 will have a temperature on the order of about 320° F. at a pressure of approximately 75 psia (pounds per square inch absolute) in the present example. The fraction of the brine that does not recirculate back through the connecting conduit 44 and external draft tube 20 flows out of the high pressure flash crystallizer 22 through brine outlet conduit 48 and is fed through an inlet valve 18a, which serves also as an exit valve for the flash crystallizer 22, to a generally vertically oriented external draft tube 20a that is operatively connected to a low pressure flash crystallizer 22a in the same manner as the draft tube 20 is operatively connected to the high pressure flash crystallizer 22. Thus, the upper end of external draft tube 20a communicates with the inside of flash crystallizer 22a through a discharge conduit 24a which has an exit nozzle 26a that is spaced above the surface level 28a of the body 30a of brine within the low pressure flash crystallizer 22a, the discharge nozzle 26a being directed downwardly at an inclined angle toward the brine surface 28a so that all of the liquid brine and entrained particulate material will flow downwardly into the body 30a of brine and none of it will tend to move in the direction of the steam takeoff system proximate the top of the low pressure flash crystallizer 22a.

Return conduit 44a connects the bottom of flash crystallizer 22a with the bottom of draft tube 20a, and the brine recirculates from the bottom of flash crystallizer 22a through conduit 44a to the bottom of draft tube 20a, and thence upwardly through the draft tube 20a and out through its discharge conduit 24a and nozzle 26a back into the flash crystallizer 22a, powered by flashing in the draft tube 20a. Placement of the inlet valve 18a directly adjacent Venturi zone 46a enables the valve to be cleaned by the high velocity flow of brine with entrained particulate matter directly adjacent to the valve 18a.

Steam from flashing in low pressure flash crystallizer 22a and its associated draft tube 20a passes through demister 32a and is conducted from the top of low pressure flash crystallizer 22a through low pressure steam conduit 34a having valve 36a therein to a low pressure stage 38a of the steam turbine 40. The low pressure stage 38a of the turbine also receives low pressure steam through an exhaust conduit 50 from the high pressure stage 38. The exhaust conduit 52 from low pressure turbine stage 38a leads to a condenser 54, the output 56 of which provides distilled water which may be used for any purpose.

The multiple flash stages provided by the two flash crystallizers 22 and 22a, and the associated multiple-stage turbine 40, are thermodynamically more efficient in the generating of electrical power than a single stage system would be. An alternative arrangement within the scope of the invention which is also thermodynamically efficient is to utilize the high pressure steam from flash crystallizer 22 to directly drive high pressure steam turbine means as shown, but to transfer heat from the low pressure steam derived from flash crystallizer 22a in heat exchanger means to a power or working fluid in a binary power system. Although the multiple flash crystallizer stages are preferred, it is to be understood that a single flash crystallizer stage may be employed within the scope of the invention.

The use of the flash crystallizers 22 and 22a and their respective associated external recirculation draft tubes 20 and 20a with silica particle seeding as described hereinafter instead of the use of conventional flash drums for flashing pure steam from the geothermal brine enables the considerable temperature drops associated with the respective flash crystallizers 22 and 22a to occur with minimized silica scaling. Otherwise such temperature drops would, because of the considerable reduction in silica solubility associated with each of the temperature drops, cause a considerable amount of scaling in the high pressure flash drum, some silica scaling in the piping between the flash drums, and a huge amount of silica scaling in the low pressure flash drum.

The silica in the brine is substantially at saturation at the well source, and is already in a slightly supersaturated condition at the wellhead because of the reduced temperature. Nevertheless, the silica precipitation reaction is a very slow one involving considerable chemical inertial lag, and the brine flow is rapid through the well and through the high temperature input flow path to the plant, so that there is minimal silica scaling in the well casing, and there is no observable silica scaling in the high temperature brine flow path from the wellhead to the inlet valve 18 to the high pressure draft tube 20 and its flash crystallizer 22, despite the temperature drop in the brine of a few degrees Fahrenheit which may occur in this high temperature flow path. Also, data developed by Magma Power Company indicates that the solubility of silica flattens out with increasing temperature as the temperature approaches 400° F. or above. This means that only a small amount of silica will precipitate from solution with temperature drops from wellhead temperatures down to approximately 400° F. This high temperature flow path is preferably thermally insulated to minimize such temperature drop, as a further assurance against silica scaling.

Each of the flash crystallizers 22 and 22a is provided with sufficient liquid brine capacity relative to the sizes of its respective input and outlet conduits as adjusted by the respective valves of its input and outlet conduits, to enable achievement of a recirculation-to-feed rate of at least approximately 6-to-1, which gives the liquid brine a residency time within each of the flash crystallizers 22 and 22a sufficient for the supersaturated condition of the silica solution to be brought down to a level that is approximately at saturation by precipitation of the silica on the seed particles. Recycling of a small percentage of the silica sludge separated at the tail end of the plant into the high pressure flash crystallizer 22 as described in detail hereinbelow to provide seed particles of silica cumulatively presenting large surface areas of silica suspended within the brine onto which precipitating silica will preferentially amorphously form causes most of the silica which precipitates out in the high pressure flash crystallizer 22 to do so in suspended, particulate form so as to flow with the brine both in the recirculation path and downstream, so that very little, if any, silica scale will form on the walls of the flash crystallizer 22 and its recirculation path including conduit 44, draft tube 20, and the draft tube discharge conduit 24 and nozzle 26.

Because of the reduced solubility of silica in the lower temperature range of the low pressure flash crystallizer 22a, much more silica will precipitate out of the geothermal brine in flash crystallizer 22a than in flash crystallizer 22. However, the seed particles which flow downstream from the high pressure flash crystallizer 22 into the low pressure flash crystallizer 22a operate in the same manner as in the high pressure flash crystallizer 22 to seed the large amount of precipitating silica onto the silica sludge particles which had already grown considerably from precipitation in the high pressure flash crystallizer 22, so that most of the large quantity of silica that precipitates out in the low pressure flash crystallizer 22a will, like that of the high pressure flash crystallizer 22, be in suspended, particulate form that will flow with the brine stream. The silica that is precipitating in the two flash crystallizers forms in growing, amorphous particles, starting with minute monomer particles $SiO_2$ and growing into polyermic silica particles $(SiO_2)_n$.

The average temperature of the brine after flashing in the low pressure flash crystallizer 22a will be approximately 242° F. for the present example, and brine at this temperature which flows out of low pressure flash crystallizer 22a will contain a relatively large amount of precipitated silica which is in particulate form suspended in the flowing brine. This brine flows from flash crystallizer 22a through outlet conduit 58 having a control valve 60 therein, the flow of the brine being maintained by a pump 62 in line 58. The brine then flows through an input conduit 64 into a reactor clarifier generally designated 66 wherein the brine is allowed to flash to approximately atmospheric pressure, which will then lower the temperature of the brine to approximately the boiling point, which for the heavily salt-laden brine of the present example is approximately 225° F. The conduits 58 and 64 between low pressure flash crystallizer 22a and reactor clarifier 66 are preferably thermally insulated to minimize temperature reduction and consequent silica scaling therein. As an alternative to flashing into the reactor clarifier 66, a flash tank (not shown) could be disposed immediately upstream of the reactor clarifier feed pump 62.

The reactor clarifier 66 serves three distinct purposes in connection with the external draft tube crystallizers of the present invention. First, it causes further silica precipitation in suspended, particulate form in the brine so as to lower the dissolved silica content from supersaturated to approximately saturated for the temperature of the brine in the reactor clarifier 66, or may even lower the silica content to slightly below saturation at that temperature. Second, the reactor clarifier 66 "clarifies" the brine by removing substantially all of the precipitated, particulate silica from the primary brine flow stream, except for a very minor quantity of extremely fine silica particles that would not be in any way harmful to the reinjection well. Third, the reactor clarifier 66 provides a source of silica seed particles which are recirculated to the high pressure flash crystallizer 22, and then in the main flow stream from high pressure crystallizer 22 to low pressure crystallizer 22a, such seed particles providing assurance that substantially all of the silica which does precipitate in each of the two flash crystallizers and their respective external draft tubes will precipitate in suspended, particulate form rather than as hard, glaze-like scale on surfaces within the two flash crystallizers and associated equipment.

The primary stream of clarified, spent brine is conducted from reactor clarifier 66 through an outlet conduit 68 to pass through a dual media filter 70 which removes any substantial particles that may have escaped through reactor clarifier 66 prior to passage of the primary brine stream back into the underground aquifer through a reinjection well generally designated 72. As an additional assurance against silica scaling in the reinjection brine flow path, both prior to and within the reinjection well 72, it is preferred that the reinjection flow path from reactor clarifier 66 to the wellhead of reinjection well 72 be thermally insulated to minimize the temperature drop therein.

Silica sludge is discharged from the bottom of reactor clarifier 66 through a gravity discharge port 74 at a flow rate controlled by a valve 76 which is sufficiently slow to enable particulate silica to accumulate in the bottom of reactor clarifier 66 to a sufficient extent for the silica sludge discharge at port 74 to be thickened preferably to approximately 10 percent by weight of silica in the sludge. Most of this sludge is then conducted through primary silica sludge conduit 78 to a sludge thickener generally designated 80, which may be a centrifuge or the like, wherein the sludge is further thickened. This primary body of sludge is then pumped through a conduit 82 to a filter press 84 or other de-watering device, with the resulting silica solids being discharged at a port 86.

The silica sludge feedback circuit for seeding the precipitation of silica in the flash crystallizers 22 and 22a includes a sludge feedback conduit 88 which connects with the primary silica sludge conduit 78 to receive a very small fraction of the approximately 10 percent by weight silica sludge from the conduit 78. Sludge feedback injection pressure is provided by means of a pump 90 in conduit 88. Feedback conduit 88 enters the bottom of the high pressure draft tube 20 and terminates therein at an injection port 92. A valve 94 in feedback conduit 88 controls the rate of flow of the seeding sludge into the draft tube 20, and hence into the brine recirculation path upwardly through the draft tube 20, transversely through its upper end discharge conduit 24 and nozzle 26, downwardly through the high pressure flash crystallizer 22, and thence transversely back to the bottom region of draft tube 20 through return conduit 44. Preferably the feedback injection port 92 is radially centered within the round cross-section of draft tube 20 for generally uniform dispersion of the seed particles over the cross-section of draft tube 20 as they enter the flow of recirculating brine. Agitation of the brine by the preliminary flashing which is occuring from the entry valve 18 up through the remainder of the draft tube 20 and through the discharge conduit 24 provides rapid dispersion of the silica seeds through the brine stream that is recirculating through the flash crystallizer 22 and draft tube 20.

The silica seeds in the brine outflow from high pressure flash crystallizer 22 through conduit 48 and valve 18a into the low pressure draft tube 20a are already substantially uniformly dispersed in this flowing brine.

Although such seeding for the low pressure flash crystallizer 22a and its draft tube 20a provided in the entering flow of brine from the upstream flash crystallizer 22 will normally be adequate, if it is desired to provide additional seeding for the low pressure flash crystallizer 22a because of the much greater amount of silica precipitation that must be accommodated therein, then a separate silica sludge injection line may take off from the sludge feedback conduit 88 and enter the bottom of low pressure draft tube 20a, injecting this seed sludge through an injection port 92a as controlled by a valve 94a, all as shown in dotted lines in FIG. 1.

The relatively small amount of silica that tends to precipitate out at the relatively high temperature of the geothermal brine in the high pressure flash crystallizer 22 may enable the flow of feedback sludge to flash crystallizer 22 to be reduced by throttling at valve 94 after a continuous cycle of operation of a plant has lasted sufficiently long for the silica particle content in high pressure flash crystallizer 22 to become stabilized in both quantity and dispersion so as to be at least partially self-seeding. This may be after a week or more of continuous plant operation.

Details of the structure and operation of the reactor clarifier 66 are set forth both in the aforesaid Featherstone U.S. Pat. No. 4,429,535 and in the aforesaid Van Note U.S. Pat. Nos. 4,302,328 and 4,304,666; the reactor clarifier disclosures of these three prior patents are hereby incorporated by reference as a part of the present disclosure.

Figure 2:
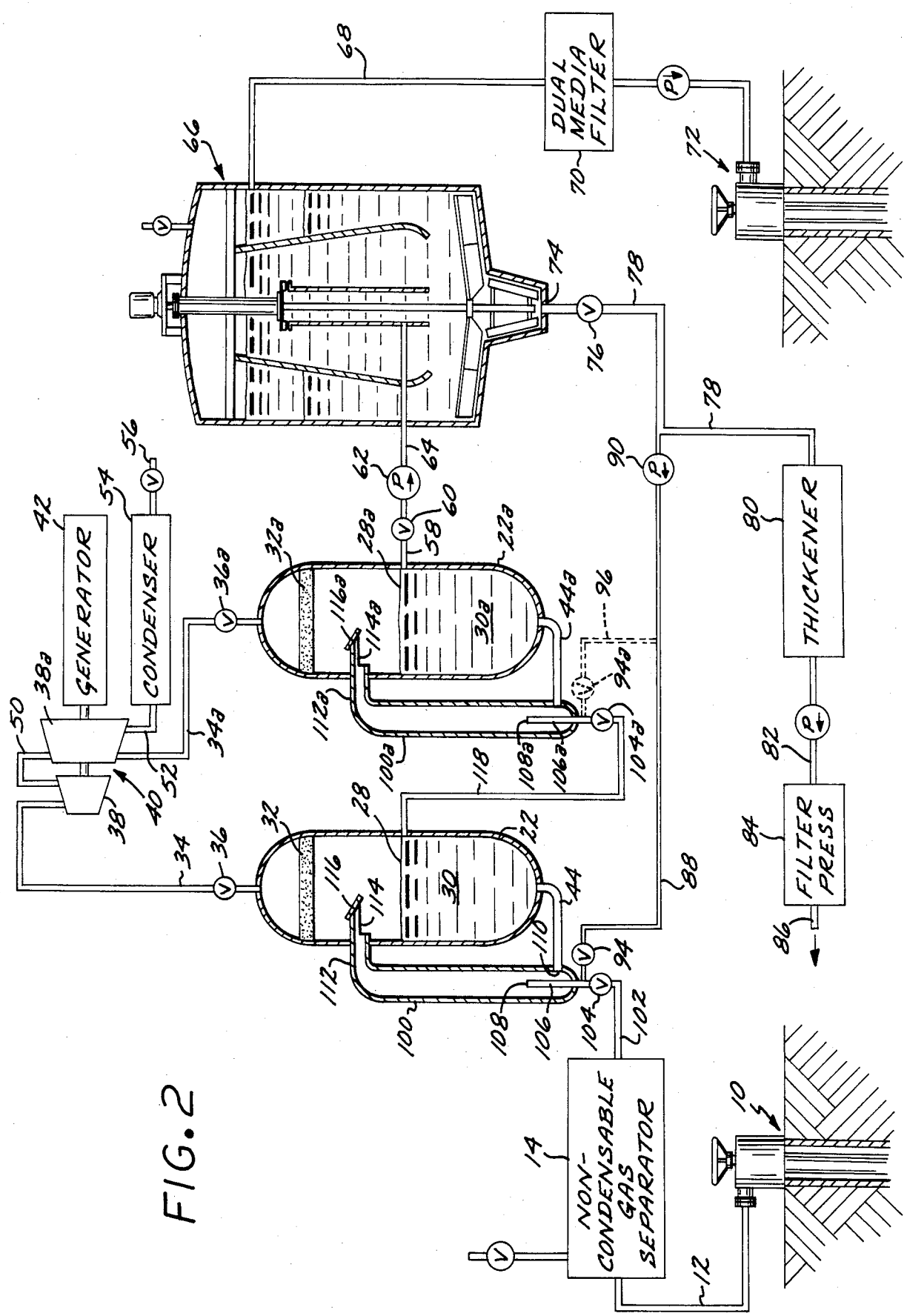
FIG. 2 is a diagrammatic view similar to FIG. 1 illustrating another embodiment of the invention in which the hot geothermal brine enters the draft tube through an injector pipe which opens upwardly into the draft tube.

The embodiment of the present invention diagrammatically illustrated in FIG. 2 is identical to the form of the invention shown in FIG. 1, except for the configuration of the draft tubes, the manner in which hot geothermal brine is introduced into the draft tubes, and the manner in which silica seed particles are introduced into the high pressure draft tube/flash crystallizer circulation loop. Accordingly, all of the other portions of the equipment illustrated in FIG. 2 are numbered the same as the corresponding portions in FIG. 1, and it is to be understood that the modes of operation and functions of the parts, as well as the results thereof, as described in detail hereinabove, all apply to the form of the invention shown in FIG. 2, except with respect to the configurations of the draft tubes, introduction of hot brine into the draft tubes, and introduction of silica seed particles into the high pressure draft tube/flash crystallizer loop.

Referring to FIG. 2, the high pressure external draft tube is designated 100, and the low pressure external draft tube is designated 100a. Draft tubes 100 and 100a are straight upright right circular cylindrical tubes, without the constricted Venturi zones 46 and 46a of draft tubes 20 and 20a of FIG. 1. The hot brine input conduit from geothermal production well 10 is designated 102 in FIG. 2, and is adjustably connected through an inlet valve 104 to a brine injector pipe 106 which extends upwardly through the bottom of draft tube 100 and coaxially within the lower portion of draft tube 100. Brine injector pipe 106 opens upwardly at its upper end 108 into draft tube 100, the upper end 108 of injector pipe 106 being located above the opening 110 of return conduit 44 from flash crystallizer 22 into the lower end portion of draft tube 100.

The upper end of draft tube 100 curves into a horizontal discharge conduit 112 which extends into flash crystallizer 22 above the liquid surface level 28 therein. The lower half of discharge conduit 112 is cut away along a substantial length of discharge conduit 112 within flash crystallizer 22 to provide a downwardly facing opening 114, and the inner end of the opened internal portion of discharge conduit 112 is capped with a downwardly and inwardly inclined deflector plate 116.

The recirculation loop for the high pressure flash crystallizer 22 in FIG. 2 is thus constituted by the external draft tube 100, the discharge conduit 112 at the upper end of draft tube 100 which discharges the hot inflowing brine and flashed steam through discharge opening 114, the flash crystallizer 22, and the return conduit 44 from the bottom of flash crystallizer 22 to the lower end portion of draft tube 100. Deflector plate 116 deflects the upper half of the hot brine and flashed steam angularly downwardly toward the surface 28 of the brine within flash crystallizer 22, the upper half of the hot brine and flashed steam carrying the lower half thereof angularly downwardly with it. A portion of the brine solution flashes into steam as the brine is released through inlet valve 104 into the brine injector pipe 106, the mixture of hot brine and steam being injected vertically upwardly from the upper end 108 of injector pipe 106 into external draft tube 100, thereby forming a vertically rising mixture of vapor and amorphous particles composed primarily of silica, with the hot brine solution that is supersaturated with silica. Continuous recirculation of the brine upwardly through draft tube 100 and then downwardly through flash crystallizer 22 is, in the form of the invention shown in FIG. 2, produced by three cooperating physical characteristics: (1) the density of the brine within draft tube 100 being lower than the density of the brine in flash crystallizer 22 due to the bubbling steam in draft tube 100; (2) the density of the brine within draft tube 100 being lower than the denisty of the brine in flash crystallizer 22 because the incoming brine within draft tube 100 has a higher temperature than the brine within flash crystallizer 22; and (3) the coaxially upwardly directed incoming hot brine and flashing steam from injector pipe 106 into draft tube 100 has a considerable momentum which converts into recirculation power.

Brine outlet conduit 118 from high pressure flash crystallizer 22 corresponds to brine outlet conduit 48 of FIG. 1, but in the apparatus of FIG. 2 brine outlet conduit 118 is adjustably connected through input valve 104a to brine injector pipe 106a which injects the brine from high pressure flash crystallizer 22 into low pressure external draft tube 100a which is operatively associated with low pressure flash crystallizer 22a in the same manner that high pressure draft tube 100 is associated with high pressure flash crystallizer 22. The low pressure recirculation loop is structurally and operatively the same as the high pressure recirculation loop, being constituted by the external draft tube 100a, its upper end discharge conduit 112a and downwardly facing discharge opening 114a with downardly angled deflector plate 116a, the low pressure flash crystallizer 22a, and the return conduit 44a which discharges the return fluid into the lower end portion of external draft tube 100a through opening 110a.

The recirculation of hot brine and silica seeds in the low pressure recirculation loop is powered in the same way that the recirculation is powered in the high pressure loop, namely, by the lower density of brine and flashing steam in external draft tube 100a relative to the brine in flash crystallizer 22a because of bubbling steam and higher temperature, and also by the inertia of incoming brine and flashing steam directed upwardly into draft tube 100a through brine injector pipe 106a.

Silica sludge feedback is provided through sludge feedback conduit 88 under the pressure of pump 90 in conduit 88, through feedback valve 94 into high pressure brine injector pipe 106 above or downstream of hot brine inlet valve 104, but preferably externally of high pressure draft tube 100 for convenience of construction. Thus, the agitation of the hot incoming brine by preliminary flashing at inlet valve 104 and within brine injector pipe 106, and then up through the remainder of external draft tube 100 and through discharge conduit 112 provides rapid dispersion of the silica seeds through the brine stream that is recirculating through flash crystallizer 22 and external draft tube 100.

As with the form of the invention shown in FIG. 1, seeding for the low pressure flash crystallizer 22a and its draft tube 100a is provided in the entering flow of brine from the upstream flash crystallizer 22. However, if it is desired to provide additional seeding for the low pressure flash crystallizer 22a because of the much greater amount of silica precipitation that must be accommodated therein, then a separate silica sludge injection conduit 96 may take off from sludge feedback conduit 88 and be fed through a feedback valve 94a into low pressure brine injector pipe 106a, all as shown in dotted lines in FIG. 2.

While the present invention has been shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

I claim:

1. In a geothermal energy system which has a geothermal brine flow path comprising a production well providing a flow stream of high temperature, high dissolved silica content geothermal brine, a system for continuously flashing a portion of said geothermal brine stream into steam for power generating purposes while at the same time minimizing silica scaling from silica supersaturation of the brine caused by temperature reduction from said flashing, said system comprising:

flash crystallizer means in said flow path within which the majority of said flashing of a portion of said geothermal brine stream into steam occurs for power generating purposes, draft tube means located externally of said flash crystallizer means and having upper and lower end portions, said upper end portion having discharge conduit means opening into said flash crystallizer means above the liquid brine surface level therein, and said lower end portion communicating with a lower end portion of said flash crystallizer means through return conduit means;

said draft tube means, discharge conduit means, flash crystallizer means and return conduit means defining brine recirculation loop means;

means for continuously injecting the geothermal brine flow stream from said production well into said draft tube means below said upper end portion thereof, some of such injected geothermal brine flashing into steam within said draft tube means so as to provide thermal power for circulating an unflashed portion of said geothermal brine stream a plurality of times through said loop means; and means for introducing particulate material into said loop means so as to seed the precipitation of dissolved silica from said brine, whereby silica which precipitates in said loop means will be primarily in suspended, particulate form rather than in the form of scaling in said recirculation path means.

2. The system of claim 1, wherein said introducing means is connected to said draft tube means so as to introduce said particulate material into said draft tube means.

3. The system of claim 2, wherein said introducing means is connected to said draft tube means so as to introduce said particulate material into a lower portion of said draft tube means.

4. The system of claim 2, wherein said introducing means is connected to said draft tube means through said injecting means.

5. The system of claim 1, which comprises reactor clarifier means in said geothermal brine flow path downstream of said flash crystallizer means and arranged to receive spent geothermal brine from said flash crystallizer means, said reactor clarifier means having silica sludge output means;

said introducing means comprising sludge feedback means from said sludge output means to said loop means.

6. The system of claim 1, wherein said discharge conduit means comprises output means directed downwardly toward the surface of liquid brine in said flash crystallizer means.

7. The system of claim 6, wherein said output means is directed downwardly at an inclined angle toward the surface of liquid brine in said flash crystallizer means.

8. The system of claim 7, wherein said output means comprises deflector plate means.

9. The system of claim 1, wherein said draft tube means is generally vertically oriented.

10. The system of claim 1, wherein the rate of brine recirculation in said loop means relative to the rate of brine flow into and out of said loop means is at least approximately six-to-one.

11. The system of claim 1, wherein said flash crystallizer means comprises a plurality of flash crystallizers in series in said brine flow path;

each of said flash crystallizers having a respective said draft tube means connected thereto so as to define a said brine loop means.

12. The system of claim 11, which comprises reactor clarifier means in said geothermal brine flow path downstream from the most downstream of said plurality of flash crystallizers and arranged to receive spent geothermal brine from such most downstream flash crystallizer, said reactor clarifier means having silica sludge output means;

said introducing means comprising sludge feedback means from said sludge output means to said loop means of the most upstream of said plurality of flash crystallizers.

13. The system of claim 12, wherein said introducing means for a flash crystallizer downstream of said most upstream flash crystallizer comprises the portion of said brine flow path from said most upstream flash crystallizer to said downstream flash crystallizer;

said particulate material flowing with the geothermal brine from said most upstream flash crystallizer through said portion of said brine flow path so as to be introduced into said downstream flash crystallizer.

14. The system of claim 1, wherein said injecting means comprises injector pipe means opening upwardly into said draft tube means.

15. The system of claim 14, wherein said pipe means opens into said draft tube means in a lower portion thereof but above the communication of said return conduit means with said draft tube means.

16. In a geothermal energy system which has a geothermal brine flow path comprising a production well providing a flow stream of high temperature, high dissolved silica content geothermal brine, a method for continuously flashing a portion of said geothermal brine stream into steam for power generating purposes while at the same time minimizing silica scaling from silica supersaturation of the brine caused by temperature reduction from said flashing, said method comprising:

(a) establishing brine recirculation loop means comprising flash crystallizer means, and draft tube means located externally of said flash crystallizer means and having an upper end portion that communicates with said flash crystallizer means above the liquid brine surface level therein, and a lower end portion that communicates with a lower end portion of said flash crystallizer means;

(b) continuously injecting the geothermal brine flow stream from said production well into said draft tube means below said upper end portion thereof and flashing some of such injected geothermal brine into steam within said draft tube means so as to provide thermal power which circulates an unflashed portion of said geothermal brine stream a plurality of times through said loop means;

(c) releasing said circulating unflashed portion of said geothermal brine stream from said draft tube means into said flash crystallizer means above the liquid level in said flash crystallizer means instead of below such level so as to avoid geysering within said flash crystallizer means; and (d) introducing particulate material into said recirculation path means so as to seed the precipitation of dissolved silica from said brine, whereby silica which precipitates in said loop means will be primarily in suspended, particulate form rather than in the form of scaling in said recirculation path means.

17. The method of claim 16, which comprises introducing said particulate material into said draft tube means.

18. The method of claim 17, which comprises introducing said particulate material into a lower portion of said draft tube means.

19. The method of claim 17, which comprises introducing said particulate material into said brine flow stream so that said particulate material is carried into said draft tube means with said brine flow stream.

20. The method of claim 16, wherein the source of said particulate material is silica sludge obtained from reactor clarifier means in said geothermal brine flow path downstream of said flash crystallizer means and arranged to receive spent geothermal brine from said flash crystallizer means.

21. The method of claim 16, wherein said releasing directs said circulating unflashed portion of the geothermal brine stream downwardly toward the surface of liquid brine in said flash crystallizer means.

22. The method of claim 16, wherein said releasing directs said circulating unflashed portion of said geothermal brine stream downwardly at an inclined angle toward the surface of liquid brine in said flash crystallizer means.

23. The method of claim 16, wherein said unflashed circulating portion of said geothermal brine stream flows substantially vertically upwardly through said draft tube means.

24. The method of claim 16, wherein the rate of brine recirculation in said loop means relative to the rate of brine flow into and out of said loop means is at least approximately six-to-one.

25. The method of claim 16, which comprises establishing a plurality of said brine loop means in series in said brine flow path; and performing each of steps (b), (c) and (d) of claim 16 in each of said loop means.

26. The method of claim 25, wherein the source of said particulate material is silica sludge obtained from reactor clarifier means in said geothermal brine flow path downstream from the most downstream of said plurality of loop means and arranged to receive spent geothermal brine from such most downstream loop means; and introducing said silica sludge into the most upstream of said plurality of loop means.

27. The method of claim 26, wherein said particulate material that is introduced into a said loop means downstream of said most upstream loop means is provided from said most upstream loop means through said geothermal brine flow path.

28. The method of claim 16, wherein said injecting is directly upwardly into said draft tube means.

29. The method of claim 28, wherein said injecting is into a lower portion of said draft tube means but above the communication of said flash crystallizer means with said lower end portion of said draft tube means.

* * * * *